(12) United States Patent
Kim et al.

(10) Patent No.: US 10,095,977 B1
(45) Date of Patent: Oct. 9, 2018

(54) LEARNING METHOD AND LEARNING DEVICE FOR IMPROVING IMAGE SEGMENTATION AND TESTING METHOD AND TESTING DEVICE USING THE SAME

(71) Applicant: StradVision, Inc., Gyeongsangbuk-do (KR)

(72) Inventors: Yongjoong Kim, Gyeongsangbuk-do (KR); Woonhyun Nam, Gyeongsangbuk-do (KR); Sukhoon Boo, Gyeonggi-do (KR); Myungchul Sung, Gyeongsangbuk-do (KR); Donghun Yeo, Gyeongsangbuk-do (KR); Wooju Ryu, Gyeongsangbuk-do (KR); Taewoong Jang, Seoul (KR); Kyungjoong Jeong, Gyeongsangbuk-do (KR); Hongmo Je, Gyeongsangbuk-do (KR); Hojin Cho, Gyeongsangbuk-do (KR)

(73) Assignee: StradVision, Inc., Gyeongsangbuk-do (KR)

( * ) Notice: Subject to any disclaimer, the term of this patent is extended or adjusted under 35 U.S.C. 154(b) by 0 days.

(21) Appl. No.: 15/724,994

(22) Filed: Oct. 4, 2017

(51) Int. Cl.
*G06K 9/34* (2006.01)
*G06N 3/08* (2006.01)
*G06K 9/66* (2006.01)
*G06N 3/04* (2006.01)
*G06T 5/20* (2006.01)
*G06T 7/12* (2017.01)
*G06T 7/11* (2017.01)

(52) U.S. Cl.
CPC ............ *G06N 3/08* (2013.01); *G06K 9/66* (2013.01); *G06N 3/04* (2013.01); *G06T 5/20* (2013.01); *G06T 7/11* (2017.01); *G06T 7/12* (2017.01)

(58) Field of Classification Search
None
See application file for complete search history.

(56) References Cited

U.S. PATENT DOCUMENTS

2017/0148226 A1* 5/2017 Zhang ................ G06F 17/5081

OTHER PUBLICATIONS

Badrinarayanan et al. "SegNet: A Deep Convolutional Encoder-Decoder Architecture for Image Segmentation", arXiv, Oct. 2016.*
Int const change, "Semantic Segmentation using Fully Convolutional Networks over the years" Jun. 2017.*

* cited by examiner

*Primary Examiner* — Randolph I Chu
(74) *Attorney, Agent, or Firm* — Husch Blackwell LLP

(57) ABSTRACT

A learning method for improving image segmentation including steps of: (a) acquiring a (1-1)-th to a (1-K)-th feature maps through an encoding layer if a training image is obtained; (b) acquiring a (3-1)-th to a (3-H)-th feature maps by respectively inputting each output of the H encoding filters to a (3-1)-th to a (3-H)-th filters; (c) performing a process of sequentially acquiring a (2-K)-th to a (2-1)-th feature maps either by (i) allowing the respective H decoding filters to respectively use both the (3-1)-th to the (3-H)-th feature maps and feature maps obtained from respective previous decoding filters of the respective H decoding filters or by (ii) allowing respective K-H decoding filters that are not associated with the (3-1)-th to the (3-H)-th filters to use feature maps gained from respective previous decoding filters of the respective K-H decoding filters; and (d) adjusting parameters of CNN.

30 Claims, 11 Drawing Sheets

LEARNING METHOD AND LEARNING DEVICE FOR IMPROVING IMAGE SEGMENTATION AND TESTING METHOD AND TESTING DEVICE USING THE SAME

FIELD OF THE INVENTION

The present invention relates to a learning method, and a learning device for improving image segmentation and a testing method and a testing device using the same, and more particularly, to the learning method for improving image segmentation by using a learning device, wherein the learning device includes (i) an encoding layer having each of a (1-1)-th to a (1-K)-th filters respectively generating a (1-1)-th to a (1-K)-th feature maps by applying one or more convolution operations to a training image; (ii) a decoding layer having each of a (2-K)-th to a (2-1)-th filters respectively generating a (2-K)-th to a (2-1)-th feature maps by applying one or more deconvolution operations to the (1-K)-th feature maps; and (iii) an intermediate layer having each of a (3-1)-th to a (3-H)-th-filters respectively arranged between each of H encoding filters among the K filters included in the encoding layer and each of H decoding filters among the K filters included in the decoding layer, including steps of: (a) the learning device, if the training image is obtained, acquiring the (1-1)-th to the (1-K)-th feature maps through the encoding layer; (b) the learning device acquiring a (3-1)-th to a (3-H)-th feature maps by respectively inputting each output of the H encoding filters to the (3-1)-th to the (3-H)-th filters; (c) the learning device performing a process of sequentially acquiring the (2-K)-th to the (2-1)-th feature maps either by (i) allowing the respective H decoding filters to respectively use both the (3-1)-th to the (3-H)-th feature maps and feature maps obtained from respective previous decoding filters of the respective H decoding filters or by (ii) allowing respective K-H decoding filters that are not associated with the (3-1)-th to the (3-H)-th filters to use feature maps gained from respective previous decoding filters of the respective K-H decoding filters; and (d) the learning device adjusting parameters of at least part of the (2-1)-th to the (2-K)-th filters and the (3-1)-th to the (3-H)-th filters and the (1-1)-th to the (1-K)-th filters by performing a backpropagation process with a difference between a Ground Truth (GT) label image and the (2-1)-th feature map; and the learning device, the testing method and the testing device using the same.

BACKGROUND OF THE INVENTION

Deep Convolution Neural Networks, or Deep CNN, is the core of the remarkable development in the field of Deep Learning. Though CNN was already employed to solve character recognition problems in 1990s, it is not until recently that CNN has become widespread in Machine Learning. Due to the recent researches, Convolution Neural Networks (CNN) have been a very useful and powerful tool in the field of Machine Learning. For example, in 2012, Deep CNN significantly outperformed its competitors in an annual software contest, the ImageNet Large Scale Visual Recognition Challenge, and won the contest.

As a result, a new trend to adapt Deep Learning technologies for image segmentation has been emerged. For a reference, image segmentation may include processes of partitioning an input image, e.g. a training image or a test image, into multiple semantic segments and producing a set of the semantic segments with clear boundaries such that the semantic segments collectively cover the entire input image. A result of the image segmentation is so-called a label image.

FIG. 1 is a drawing illustrating a learning process of CNN capable of performing image segmentation according to prior art.

Referring to FIG. 1, feature maps corresponding to an input image, i.e. a training image, are acquired by applying convolution operations multiple times to the input image through a plurality of filters, i.e. convolutional filters, in an encoding layer. Then, a label image corresponding to the input image is obtained by applying deconvolution operations multiple times to a specific feature map, i.e., an ultimate output from the encoding layer.

In detail, a configuration of CNN that encodes the input image by the convolution operations to obtain its corresponding feature maps and decodes the ultimate output from the encoding layer to obtain the label image is named as an encoding-decoding network, i.e. U-Net. During the encoding process, a size of the input image or sizes of its corresponding feature maps may be reduced to a half whereas number of channels of the input image or that of its corresponding feature maps may be increased whenever a convolution operation is performed. This is to reduce an amount of computations by scaling down the size of the input image or its corresponding feature maps and to extract complex patterns through the increased number of channels.

The downsized feature maps do not have much of its high-frequency regions but retain information on its low-frequency regions which represent semantic and detailed parts of the input image, e.g. sky, roads, architectures, and cars etc. Such meaningful parts of the input image are used to infer the label image by performing the deconvolution operations during a decoding process.

Recently, efforts have been made to improve the performance of the image segmentation processes using the U-Net.

Accordingly, the applicant of the present invention intends to disclose a new method for allowing the information on the feature maps obtained from the encoding layer to be used in the decoding process, so as to increase the performance of the image segmentation.

SUMMARY OF THE INVENTION

It is an object of the present invention to provide a method for representing information on edges efficiently upon performing image segmentation.

It is another object of the present invention to provide a method for finding optimal parameters by supplying to decoders the information on edges that is obtained by using feature maps acquired from the encoding layer.

It is still another object of the present invention to provide a method and a device for accurately performing the image segmentation by using the optimal parameters.

In accordance with one aspect of the present invention, there is provided a learning method for improving image segmentation by using a learning device that includes (i) an encoding layer having each of a (1-1)-th to a (1-K)-th filters respectively generating a (1-1)-th to a (1-K)-th feature maps by applying one or more convolution operations to a training image; (ii) a decoding layer having each of a (2-K)-th to a (2-1)-th filters respectively generating a (2-K)-th to a (2-1)-th feature maps by applying one or more deconvolution operations to the (1-K)-th feature maps; and (iii) an intermediate layer having each of a (3-1)-th to a (3-H)-th filters respectively arranged between each of H encoding filters among the K filters included in the encoding layer and each of H decoding filters among the K filters included in the decoding layer, including steps of: (a) the learning device, if the training image is obtained, acquiring the (1-1)-th to the (1-K)-th feature maps through the encoding layer; (b) the learning device acquiring a (3-1)-th to a (3-H)-th feature maps by respectively inputting each output of the H encoding filters to the (3-1)-th to the (3-H)-th filters; (c) the learning device performing a process of sequentially acquiring the (2-K)-th to the (2-1)-th feature maps either by (i) allowing the respective H decoding filters to respectively use both the (3-1)-th to the (3-H)-th feature maps and feature maps obtained from respective previous decoding filters of the respective H decoding filters or by (ii) allowing respective K-H decoding filters that are not associated with the (3-1)-th to the (3-H)-th filters to use feature maps gained from respective previous decoding filters of the respective K-H decoding filters; and (d) the learning device adjusting parameters of at least part of the (2-1)-th to the (2-K)-th filters and the (3-1)-th to the (3-H)-th filters and the (1-1)-th to the (1-K)-th filters by performing a backpropagation process with a difference between a Ground Truth (GT) label image and the (2-1)-th feature map.

In accordance with another aspect of the present invention, there is provided a testing method for performing image segmentation on a test image as an input image by using a learning device, including steps of: (a) a testing device acquiring or supporting another device to acquire the test image, on conditions that (I) the learning device includes (i) an encoding layer having each of a (1-1)-th to a (1-K)-th filters respectively generating a (1-1)-th to a (1-K)-th feature maps for training by applying one or more convolution operations to a training image; (ii) a decoding layer having each of a (2-K)-th to a (2-1)-th filters respectively generating a (2-K)-th to a (2-1)-th feature maps for training by applying one or more deconvolution operations to the (1-K)-th feature maps for training; and (iii) an intermediate layer having each of a (3-1)-th to a (3-H)-th filters respectively arranged between each of H encoding filters among the K filters included in the encoding layer and each of H decoding filters among the K filters included in the decoding layer, (II) the learning device performs processes of (i) acquiring, if the training image is obtained, the (1-1)-th to the (1-K)-th feature maps for training through the encoding layer; (ii) acquiring a (3-1)-th to a (3-H)-th feature maps for training by respectively inputting each output of the H encoding filters to the (3-1)-th to the (3-H)-th filters; (iii) sequentially acquiring the (2-K)-th to the (2-1)-th feature maps for training from the decoding layer either by allowing the respective H decoding filters to respectively use both the (3-1)-th to the (3-H)-th feature maps for training and feature maps for training obtained from respective previous decoding filters of the respective H decoding filters or by allowing respective K-H decoding filters that are not associated with the (3-1)-th to the (3-H)-th filters to use feature maps for training gained from respective previous decoding filters of the respective K-H decoding filters; and (iv) adjusting parameters of at least part of the (2-1)-th to the (2-K)-th filters and the (3-1)-th to the (3-H)-th filters and the (1-1)-th to the (1-K)-th filters by performing a backpropagation process with a difference between a Ground Truth (GT) label image and the (2-1)-th feature maps for training; (b) the testing device, if the input image is obtained, acquiring or supporting another device to acquire the (1-1)-th to the (1-K)-th feature maps for testing through the encoding layer; (c) the testing device acquiring or supporting another device to acquire a (3-1)-th to a (3-H)-th feature maps for testing by respectively inputting each output of the H encoding filters to the (3-1)-th to (3-H)-th filters; and (d) the testing device performing a process of sequentially acquiring the (2-K)-th to the (2-1)-th feature maps for testing either by (i) allowing the respective H decoding filters to respectively use both the (3-1)-th to the (3-H)-th feature maps for testing and feature maps for testing obtained from respective previous decoding filters of the respective H decoding filters or by (ii) allowing respective K-H decoding filters that are not associated with the (3-1)-th to the (3-H)-th filters to use feature maps for testing gained from respective previous decoding filters of the respective K-H decoding filters.

In accordance with still another aspect of the present invention, there is provided a learning device for improving image segmentation, wherein the learning device includes (i) an encoding layer having each of a (1-1)-th to a (1-K)-th filters respectively generating a (1-1)-th to a (1-K)-th feature maps by applying one or more convolution operations to a training image as an input image; (ii) a decoding layer having each of a (2-K)-th to a (2-1)-th filters respectively generating a (2-K)-th to a (2-1)-th feature maps by applying one or more deconvolution operations to the (1-K)-th feature maps; and (iii) an intermediate layer having each of a (3-1)-th to a (3-H)-th filters respectively arranged between each of H encoding filters among the K filters included in the encoding layer and each of H decoding filters among the K filters included in the decoding layer, including: a communication part for receiving the input image; and a processor for performing processes of (I) acquiring, if the input image is obtained, the (1-1)-th to the (1-K)-th feature maps through the encoding layer; (II) acquiring a (3-1)-th to a (3-H)-th feature maps by respectively inputting each output of the H encoding filters to the (3-1)-th to the (3-H)-th filters; (III) sequentially acquiring the (2-K)-th to the (2-1)-th feature maps either by (i) allowing the respective H decoding filters to respectively use both the (3-1)-th to the (3-H)-th feature maps and feature maps obtained from respective previous decoding filters of the respective H decoding filters or by (ii) allowing respective K-H decoding filters that are not associated with the (3-1)-th to the (3-H)-th filters to use feature maps gained from respective previous decoding filters of the respective K-H decoding filters; and (IV) adjusting parameters of at least part of the (2-1)-th to the (2-K)-th filters and the (3-1)-th to the (3-H)-th filters and the (1-1)-th to the (1-K)-th filters by performing a backpropagation process with a difference between a Ground Truth (GT) label image and the (2-1)-th feature map.

In accordance with still yet another aspect of the present invention, there is provided a testing device for performing image segmentation on a test image as an input image by using a learning device, including: a communication part for receiving the input image, on conditions that (I) the learning device includes (i) an encoding layer having each of a (1-1)-th to a (1-K)-th filters respectively generating a (1-1)-th to a (1-K)-th feature maps for training by applying one or more convolution operations to a training image; (ii) a decoding layer having each of a (2-K)-th to a (2-1)-th filters respectively generating a (2-K)-th to a (2-1)-th feature maps for training by applying one or more deconvolution operations to the (1-K)-th feature maps for training; and (iii) an intermediate layer having each of a (3-1)-th to a (3-H)-th filters respectively arranged between each of H encoding filters among the K filters included in the encoding layer and each of H decoding filters among the K filters included in the decoding layer, (II) the learning device performs processes of (i) acquiring, if the training image is obtained, the (1-1)-th to the (1-K)-th feature maps for training through the encoding layer; (ii) acquiring a (3-1)-th to a (3-H)-th feature maps for training by respectively inputting each output of the H encoding filters to the (3-1)-th to the (3-H)-th filters; (iii) sequentially acquiring the (2-K)-th to the (2-1)-th feature maps for training from the decoding layer either by allowing the respective H decoding filters to respectively use both the (3-1)-th to the (3-H)-th feature maps for training and feature maps for training obtained from respective previous decoding filters of the respective H decoding filters or by allowing respective K-H decoding filters that are not associated with the (3-1)-th to the (3-H)-th filters to use feature maps for training gained from respective previous decoding filters of the respective K-H decoding filters; and (iv) adjusting parameters of at least part of the (2-1)-th to the (2-K)-th filters and the (3-1)-th to the (3-H)-th filters and the (1-1)-th to the (1-K)-th filters by performing a backpropagation process with a difference between a Ground Truth (GT) label image and the (2-1)-th feature maps for training; a processor for performing processes of (I) acquiring the (1-1)-th to the (1-K)-th feature maps for testing through the encoding layer; (II) acquiring a (3-1)-th to a (3-H)-th feature maps for testing by respectively inputting each output of the H encoding filters to the (3-1)-th to (3-H)-th filters; and (III) the testing device performing a process of sequentially acquiring the (2-K)-th to the (2-1)-th feature maps for testing either by (i) allowing the respective H decoding filters to respectively use both the (3-1)-th to the (3-H)-th feature maps for testing and feature maps for testing obtained from respective previous decoding filters of the respective H decoding filters or by (ii) allowing respective K-H decoding filters that are not associated with the (3-1)-th to the (3-H)-th filters to use feature maps for testing gained from respective previous decoding filters of the respective K-H decoding filters.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
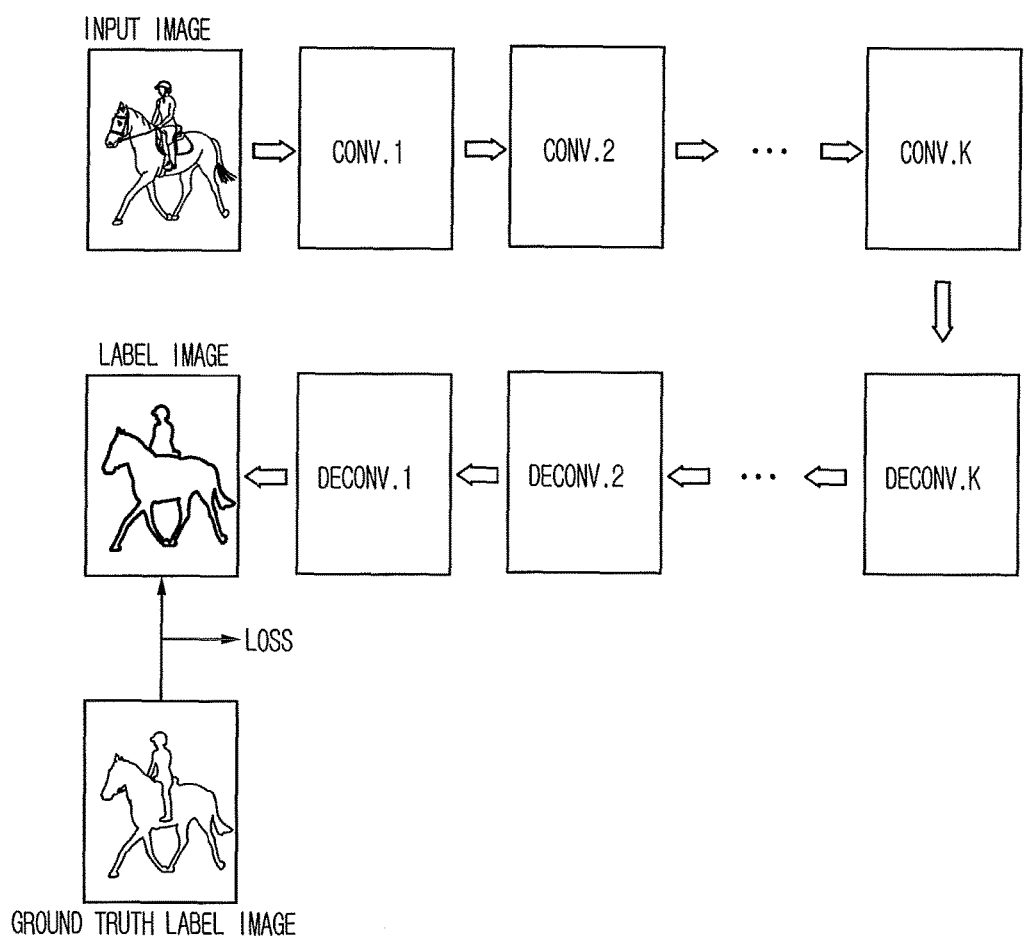
FIG. 1 is a drawing illustrating a learning process of CNN capable of performing image segmentation according to prior art.

To make purposes, technical solutions, and advantages of the present invention clear, reference is made to the accompanying drawings that show, by way of illustration, more detailed example embodiments in which the invention may be practiced. These preferred embodiments are described in sufficient detail to enable those skilled in the art to practice the invention.

It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Hereinafter, preferred embodiments of the present invention will be described in detail with reference to the accompanying drawings so that those skilled in the art may easily carry out the present invention.

Figure 2A:
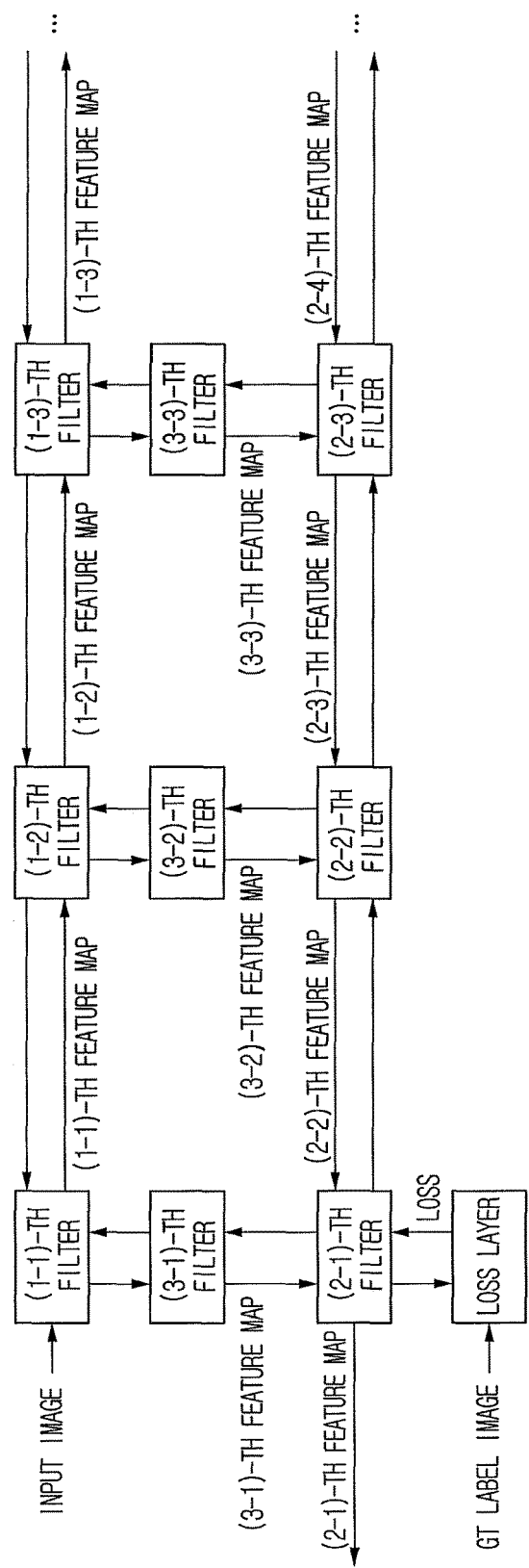
FIGS. 2A and 2B are drawings illustrating a learning process for performing image segmentation by using dilation convolutions in accordance with one example embodiment of the present invention.
Figure 2B:
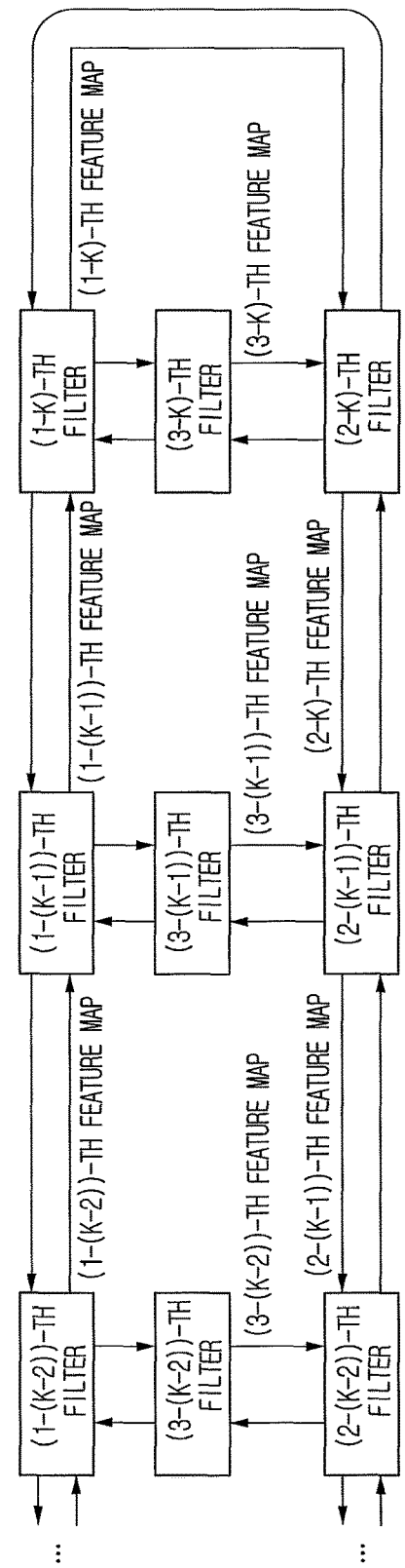

FIGS. 2A and 2B are drawings illustrating a learning process for performing image segmentation by using dilation convolutions in accordance with one example embodiment of the present invention. A learning device shown in FIGS. 2A and 2B adopting a CNN model may include a communication part (not shown) and a processor (not shown).

Specifically, the communication part may receive a training image as an input image, and the processor may be configured to perform processes of obtaining feature maps by applying convolution operations multiple times to the input image through a plurality of filters, i.e. convolutional filters, in an encoding layer. Then, the processor may be configured to perform processes of obtaining a label image corresponding to the input image by applying deconvolution operations multiple times to a specific feature map, i.e., an ultimate output from the encoding layer, through a plurality of filters, i.e. deconvolutional filters, in a decoding layer. Further, the processor may be configured to perform processes of acquiring optimal parameters of the CNN by relaying back a loss, i.e., a difference between a Ground Truth (GT) label image and an estimated label image, to each filter in the CNN during a backpropagation process.

Referring to FIGS. 2A and 2B, the learning device may include the encoding layer having K filters, i.e. a (1-1)-th to a (1-K)-th filters, and the decoding layer having corresponding K filters, i.e. a (2-1)-th to a (2-K)-th filters. That is, each of the K filters in the decoding layer corresponds to each of the (1-1)-th to the (1-K)-th filters in the encoding layer. Moreover, the learning device may include an intermediate layer having a (3-1)-th to a (3-K)-th filters respectively arranged between each of the (1-1)-th to the (1-K)-th filters in the encoding layer and each of the (2-1)-th to the (2-K)-th filters in the decoding layer. In addition, the learning device may further include at least one loss layer which computes its corresponding loss.

Further, the learning process illustrated in FIGS. 2A and 2B may be initiated by receiving the training image, i.e. the input image and then supplying the input image to the (1-1)-th filter in the encoding layer. The (1-1)-th to the (1-K)-th filters perform convolution operations to obtain the feature maps corresponding to the input image, i.e. encoded feature maps.

Specifically, as shown in FIGS. 2A and 2B, the (1-1)-th filter receives the input image, performs the convolution operations to generate a (1-1)-th feature map, and relays the (1-1)-th feature map to the (1-2)-th filter. Then, the (1-2)-th filter receives the (1-1)-th feature map, performs the convolution operations to generate a (1-2)-th feature map, and relays the (1-2)-th feature map to the (1-3)-th filter and so on and on. It can be inferred from the above description that such a procedure continues with the rest of filters in the encoding layer and may eventually advance to the (1-K)-th filter to generate a (1-K)-th feature map.

Herein, a size of an output of each of the (1-1)-th to the (1-K)-th filters is reduced to, e.g., a half of that of an input thereof. Moreover, number of channels of the output of each of the (1-1)-th to the (1-K)-th filters is increased as twice as that of the input thereof whenever the convolution operation is applied, but a ratio of increment or that of decrement of the size and the number of channels is not limited.

For example, if the size of the training image is 640×480 and the number of channels thereof is 3, the size of the (1-1)-th feature map is 320×240 and the number of channels thereof is 8, and the size of the (1-2)-th feature map is 160×120 while the number of channels thereof is 16 and so on.

Thereafter, the (1-K)-th feature map is inputted to the decoding layer to generate the label image. The (2-K)-th to the (2-1)-th filters in the decoding layer perform deconvolution operations to obtain the label image.

Referring to FIGS. 2A and 2B, the learning device may further include the intermediate layer which is disposed between the encoding layer and the decoding layer, and the intermediate layer may include the (3-1)-th to the (3-K)-th filters. The (3-1)-th filter may be arranged between the (1-1)-th filter and the (2-1)-th filter, and the (3-2)-th filter may be arranged between the (1-2)-th filter and the (2-2)-th filter and so on. That is, each filter in the intermediate layer may be arranged between each corresponding filter in the encoding layer and each corresponding one in the decoding layer.

As one example, all of the (3-1)-th to the (3-K)-th filters may be dilation convolution filters. As another example, it may be possible that a part of the (3-1)-th to the (3-K)-th filters may be a dilation convolution filter(s). Herein, it may also be possible that other filters except for the dilation convolution ones among the (3-1)-th to the (3-K)-th filters may be convolution filter(s).

Further, the (3-1)-th to the (3-K)-th filters may respectively generate the (3-1)-th to the (3-K)-th feature maps by extracting information on edges from the (1-1)-th to the (1-K)-th feature maps, respectively. Herein, the (3-1)-th to the (3-K)-th filters may acquire the (3-1)-th to the (3-H)-th feature maps by extracting specific portions, in which frequency changes are equal to or greater than a predetermined threshold value, from the (1-1)-th to the (1-K)-th feature maps, respectively. For example, the specific portions may be edges in the input image.

Upon applying the deconvolution operations to feature maps provided from their corresponding previous filters, the filters in the decoding layer may also utilize the information on edges included in their corresponding feature maps among the (3-1)-th to the (3-K)-th feature maps.

In general, there was a problem in that the information on edges may not be recovered during a decoding process of increasing a size of a decoded feature map. Thus, in accordance with the present invention, the processor allows the information on edges to be provided from the filters in the intermediate layer to the filter in the decoding layer in order to recover the information on edges.

In detail, the intermediate layer may extract the information on edges from the respective encoded feature maps obtained from each of the filters in the encoding layer, and may respectively relay the information on edges within the (3-1)-th to the (3-K)-th feature maps to individual corresponding filters in the decoding layer. Hence, the extracted information on edges may be used upon performing the deconvolution operations.

Hereinafter, a learning process of CNN capable of performing image segmentation may be described based on one example embodiment of the present invention in which the (3-1)-th to the (3-K)-th filters are all the dilation convolution filters.

After receiving the (1-1)-th feature map from the (1-1)-th filter, the (3-1)-th filter may perform a dilation convolution operation thereon to generate the (3-1)-th feature map and may provide it to the (2-1)-th filter. Subsequently, after receiving the (1-2)-th feature map from the (1-2)-th filter, the (3-2)-th filter may perform the dilation convolution operation thereon to generate the (3-2)-th feature map and may provide it to the (2-2)-th filter and so on. That is, the rest of the filters in the intermediate layer may follow the same procedure.

Figure 3A:
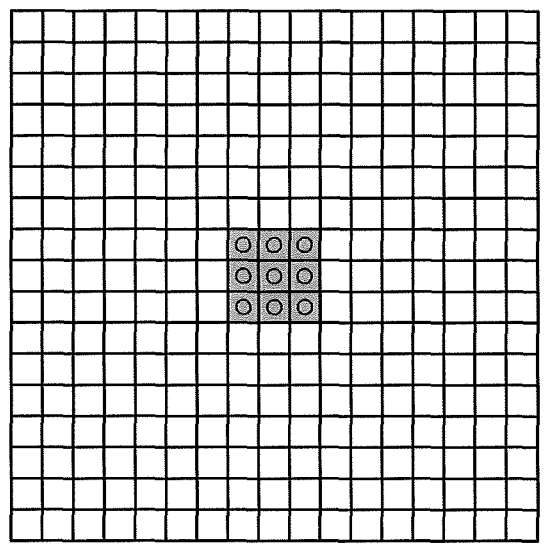
FIGS. 3A to 3C are drawings showing examples of dilation convolution filters with various FOVs and FIG. 3D is a drawing illustrating a difference between a convolution operation and a dilation convolution operation.

FIG. 3A is a drawing showing an example of a convolution filter. And FIGS. 3B to 3C are drawings showing various examples of dilation convolution filters with their corresponding field of views (FOVs).

Figure 3B:
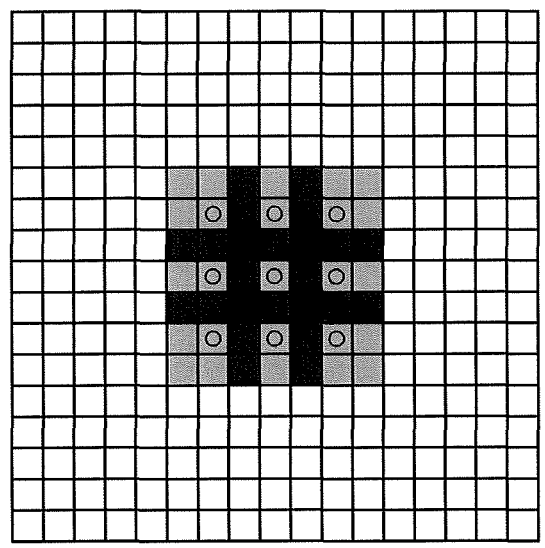
Figure 3C:
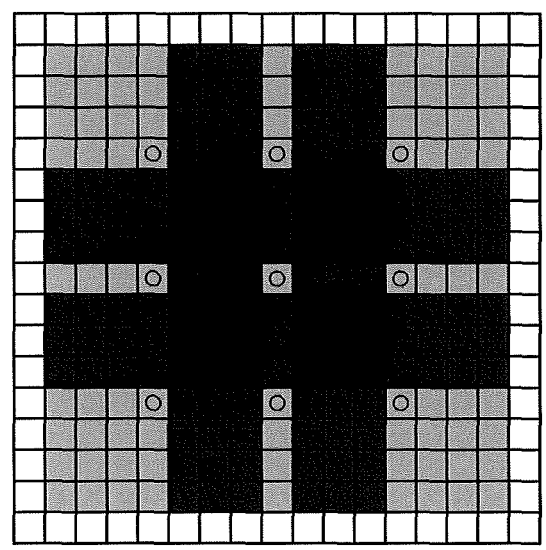

Referring to FIGS. 3B to 3C, the dilation convolution operation may be performed by changing a configuration of the convolution filter shown in FIG. 3A to the one with the configuration shown in FIG. 3B or 3C. Hence, a size of the dilation convolution filter may be larger than that of the convolution filter. In order to dilate filter size, a part of weights, i.e. parameters, of the dilation convolution filter may be filled with zeros except for weights obtained from the convolution filter. Even if the filter size is dilated, overall computation time may remain the same due to zero weights. Hence, the FOV (field of view) may be increased without increasing the overall computation time since computation time of the zero weights are very short. Further, even if the filter size is dilated, the FOV may be enlarged without a loss of resolution.

As shown in FIGS. 3B and 3C, values of the weights obtained from the convolution filter are indicated as dots, whereas the remaining parts of the FOVs are filled with zeros. Herein, the FOV may represent pixel regions in an inputted feature map required to generate one pixel region in an outputted feature map.

As shown in FIGS. 3A to 3C, various FOVs are shown. FIG. 3A illustrates that each element of the convolution filter has a FOV of 3×3 whereas FIG. 3B illustrates that each element within 2-dilation convolution filter has a FOV of 7×7. And finally, FIG. 3C shows that a single element within 4-dilation convolution filter has a FOV of 15×15.

Figure 3D:
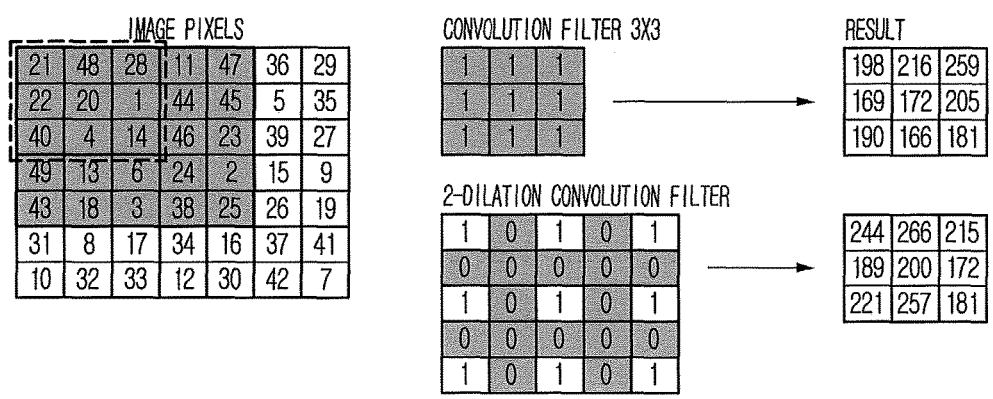

Further, respective computation examples of a convolution operation and a dilation convolution operation are shown in FIG. 3D. The leftmost part in FIG. 3D shows pixel values of the training image or a feature map to be computed. The middle part in FIG. 3D illustrates a convolution filter and a 2-dilation convolution filter. Although the computation time is identical for both filters, the FOV of respective elements within the 2-dilation convolution filter is larger than that of respective elements within the convolution filter. The rightmost part in FIG. 3D shows respective 3×3 results of both operations. A general convolution operation may generate one output pixel element in upper 3×3 result in the rightmost part in FIG. 3D by applying the convolution operation to pixels in a dotted area overlapped with the size of the convolution filter. Whereas the dilation convolution operation may generate one output pixel element in lower 3×3 result in the rightmost part in FIG. 3D by applying the dilation operation to pixels in the shaded area overlapped with the whole 2-dilation convolution filter. That is, the whole elements in the shaded area of image pixels at the leftmost part in FIG. 3D are involved in 2-dilation convolution operations. Compared with the convolution filter, the 2-dilation convolution filter may refer to the larger shaded area even if the computation time is identical for the both filters.

Figure 4:
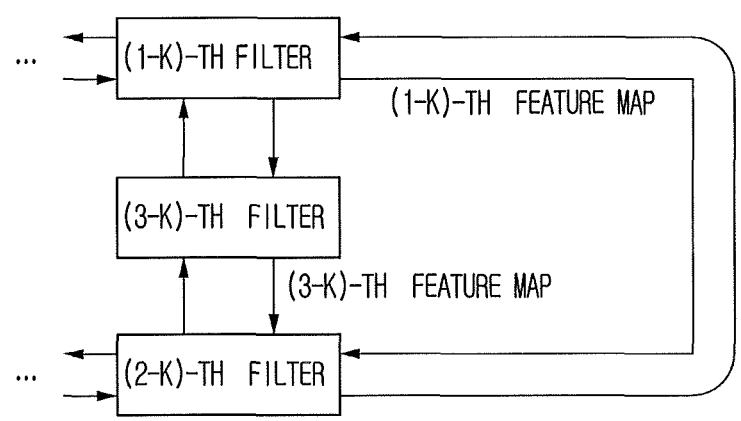
FIG. 4 is a drawing illustrating a process of generating a (2-K)-th feature map in accordance with one example embodiment of the present invention.

FIG. 4 is a drawing illustrating a process of generating the (2-K)-th feature map in accordance with one example embodiment of the present invention.

Referring to FIG. 4, the (2-K)-th filter may perform a deconvolution operation on the (1-K)-th feature map and the (3-K)-th feature map. For example, the (2-K)-th filter may add the (1-K)-th feature map with the (3-K)-th feature map and then perform the deconvolution operation thereon to acquire the (2-K)-th feature map. That is, after performing the deconvolution operation of combining features in the (1-K)-th feature map and the (3-K)-th feature map to thereby obtain a result of the deconvolution operation, the (2-K)-th filter may acquire the (2-K)-th feature map. Herein, as an example, the operation of combining features in the (1-K)-th feature map and the (3-K)-th feature map may be an operation of summing respective pixel values of the (1-K)-th feature map and the (3-K)-th feature map, but it is not limited thereto. However, the (2-K)-th filter may perform the deconvolution operations on the (1-K)-th feature map to generate an interim feature map and then may perform the operation of summing the (3-K)-th feature map and the interim feature map to thereby generate the (2-K)-th feature map, as the case may be.

Figure 5:
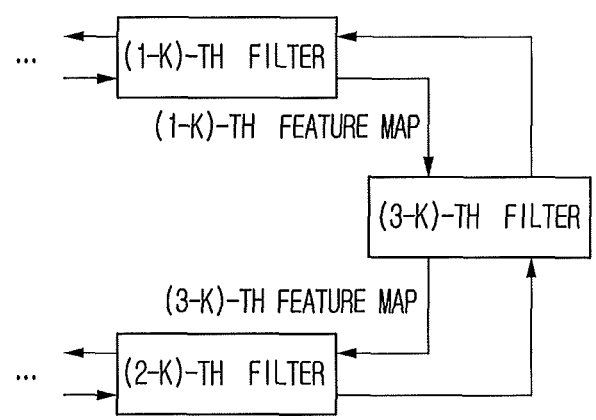
FIG. 5 is a drawing illustrating a process of generating the (2-K)-th feature map in accordance with another example embodiment of the present invention.

FIG. 5 is a drawing illustrating a process of generating the (2-K)-th feature map in accordance with another example embodiment of the present invention.

Referring to FIG. 5, the (3-K)-th filter may perform the dilation convolution operations on the (l-K)-th feature map to generate the (3-K)-th feature map, and then the (2-K)-th filter may perform the deconvolution operation on the (3-K)-th feature map to produce the (2-K)-th feature map.

Thereafter, the (2-(K−1))-th filter may receive the (2-K)-th feature map from the (2-K)-th filter and the (3-(K−1))-th feature map from the (3-(K−1))-th filter, and then perform predetermined operations thereon to acquire the (2-(K−1))-th feature map and so on. For a reference, all the filters in the decoding layer may follow the above procedure to eventually let the (2-1)-th filter generate the (2-1)-th feature map.

Herein, a size of an output of each of the (2-K)-th to the (2-1)-th filters is increased as twice as that of the input thereof. Moreover, number of channels of the output of each of the (2-K)-th to the (2-1)-th filters is reduced to, e.g., a half of that of an input thereof whenever the deconvolution operation is applied.

For example, if the size of the (2-K)-th feature map is 20×15 and the number of channels thereof is 128, the size of the (2-(K−1))-th feature map is 40×30 and the number of channels thereof is 64. Likewise, the size of the (2-(K−2))-th feature map is 80×60 and the number of channels thereof is 32 etc.

Referring to FIGS. 2A and 2B again, the learning device may further include a loss layer that computes the loss by comparing the GT label image to the (2-1)-th feature map, i.e. the estimated label image. The estimated label image may be acquired by further processing the (2-1)-th feature map. The computed loss may be relayed back to the respective filters in the decoding layer, the intermediate layer and the encoding layer during the backpropagation process to thereby adjust parameters of at least one of the (2-1)-th to the (2-K)-th filters, the (3-1)-th to the (3-K)-th filters and the (1-K)-th to the (1-1)-th filters.

Figure 6A:
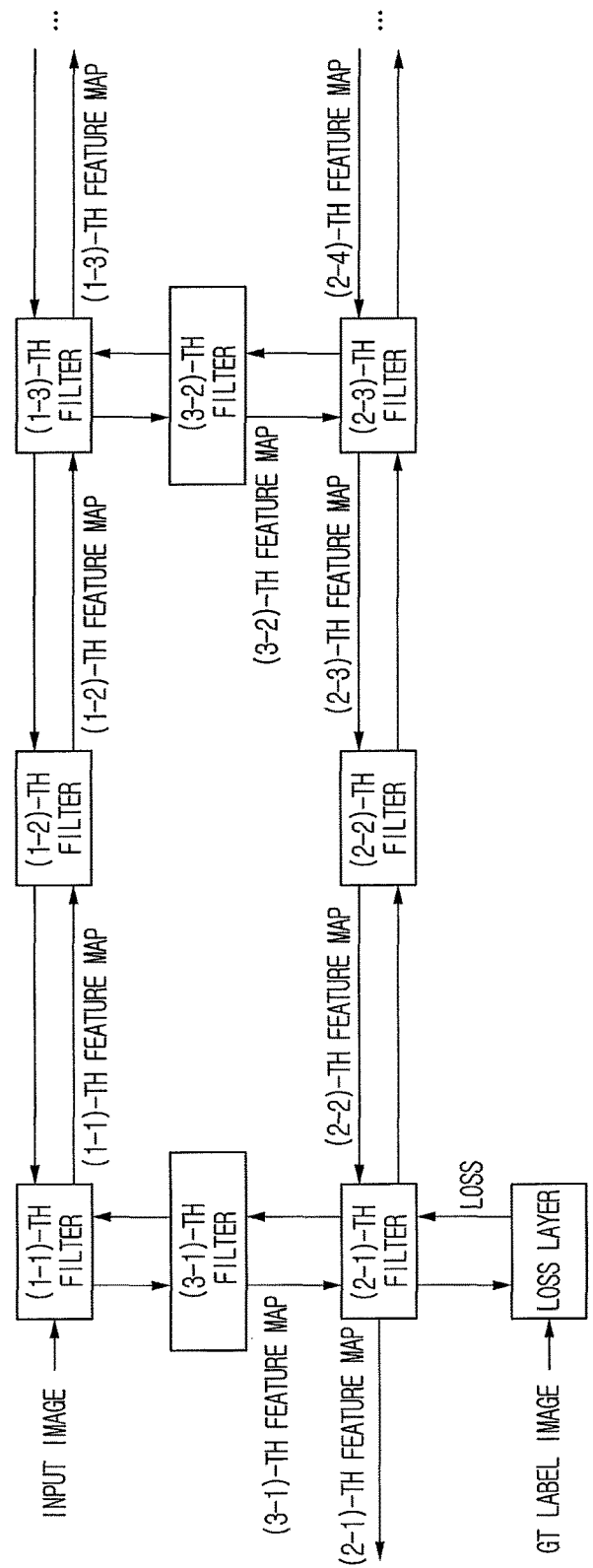
FIGS. 6A and 6B are drawings illustrating a learning process for performing image segmentation by using dilation convolutions in accordance with another example embodiment of the present invention.
Figure 6B:
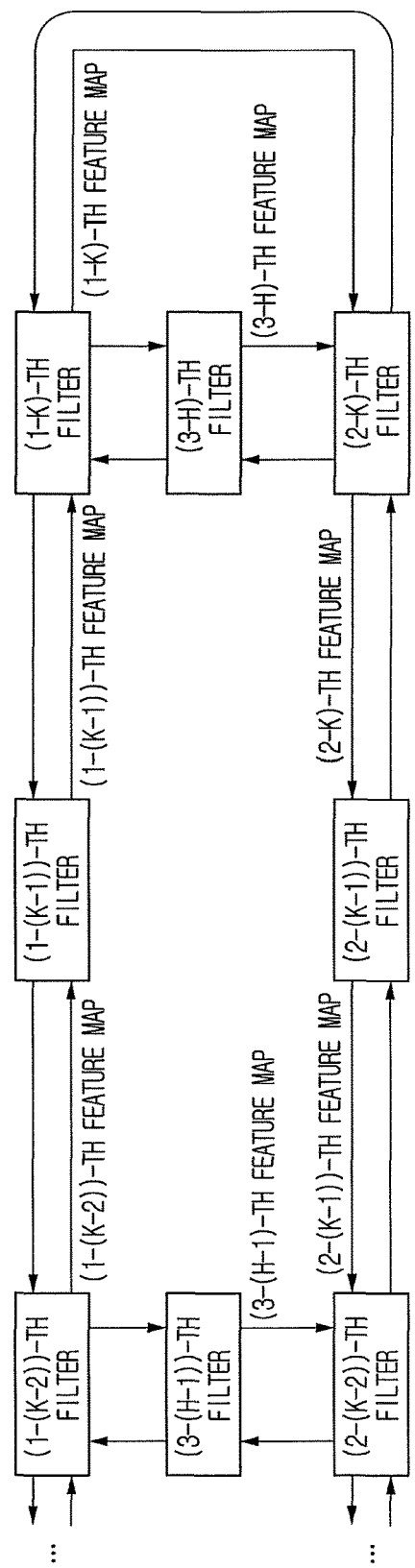

FIGS. 6A and 6B are drawings illustrating a learning process for performing image segmentation by using dilation convolutions in accordance with another example embodiment of the present invention.

The learning process illustrated in FIGS. 6A and 6B may be similar to the one illustrated in FIGS. 2A and 2B except that the filters in the intermediate layer may not be arranged between all the filters in the encoding layer and all the filters in the decoding layer. That is, the number of filters in the intermediate layer associated with the filters in the encoding layer and in the decoding layer may be less than K.

Referring to FIGS. 6A and 6B, the intermediate layer may contain H filters, where H is an integer greater than or equal to 1 and less than K. The H filters among the (3-1)-th to the (3-H)-th filters may interact with H filters selected among the (1-1)-th to the (1-K)-th filters in the encoding layer and H filters selected among the (2-1)-th to the (2-K)-th filters in the decoding layer. Herein, the H filters selected among the (1-1)-th to the (1-K)-th filters in the encoding layer may be referred to as a (1-1)-th to a (1-H)-th filters and the H filters selected among the (2-1)-th to the (2-K)-th filters in the decoding layer may be referred to as a (2-1)-th to a (2-H)-th filters.

In detail, the (1-1)-th to the (1-H)-th filters are sequentially numerated from the left side to the right side of the encoding layer. Also, the (2-1)-th to the (2-H)-th filters of the decoding layer are sequentially numerated from the left side to the right side of the decoding layer. However, comparing to each set of the K filters, the like reference numerals may not refer to the like parts. For instance, the (2-2)-th filter among the H filters may refer to a different filter from the (2-2)-th filter among the K filters.

In FIGS. 6A and 6B, while performing a process of sequentially acquiring the (2-K)-th to the (2-1)-th feature maps, the learning device may allow each of the H filters in the decoding layer respectively corresponding to each of the (3-1)-th to the (3-H)-th filters to apply the deconvolution operation to both each of the (3-1)-th to the (3-H)-th feature maps and each of feature maps obtained from respective previous decoding filters. Moreover, the learning device may allow each of K-H filters in the decoding layer, i.e. K-H decoding filters, that are not associated with the (3-1)-th to the (3-H)-th filters to apply the deconvolution operation to each of feature maps gained from respective previous decoding filters of the respective K-H decoding filters.

In other words, a part of the encoded feature maps, among the (1-1)-th to the (1-K)-th feature maps, that are respectively interacting with the (3-1)-th to the (3-H)-th filters may be utilized by each of the (3-1)-th to the (3-H)-th filters to extract the information on edges therefrom and then to produce the (3-1)-th to the (3-H)-th feature maps.

In case the filters in the intermediate layer are associated with only a part of the filters in the encoding layer and only a part of the filters in the decoding layer, an amount of computations may be reduced for the intermediate layer, and the information on edges within the encoded feature maps may be carried to the respective corresponding filters in the decoding layer. As a result, an efficiency of the learning process may still be retained.

FIGS. 2A and 2B to FIGS. 6A and 6B illustrate the learning device for image segmentation and the learning method using the same in accordance with the present invention. The learning device may find the optimal parameters through the backpropagation process.

Hereinafter, a configuration of a testing device (not shown) for performing image segmentation will be briefly described. The testing device utilizes the above-mentioned optimal parameters found through the learning process and performs image segmentation on test images. The testing device may be the same device as the learning device but it may be a different one as the case may be. The duplicated description or disclosure on the same or similar components or functions as those set forth above may not be repeated and the detailed description of such components and functions may be omitted herein.

The testing device for performing image segmentation on a test image as an input image includes a communication part (not shown) and a processor (not shown). The communication part may be configured to communicate with external devices.

Particularly, the communication part may be configured to acquire the test image, on the conditions that the learning device described above completes the learning process mentioned above and acquires adjusted parameters of at least one of the filters in the decoding layer, the intermediate layer and the encoding layer. Moreover, the processor may be configured for performing image segmentation on the acquired test image by executing the following processes: (I) acquiring the (1-1)-th to the (1-K)-th feature maps for testing through the encoding layer; (II) acquiring a (3-1)-th to a (3-H)-th feature maps for testing by respectively inputting each output of the H encoding filters to the (3-1)-th to (3-H)-th filters; and (III) performing a process of sequentially acquiring the (2-K)-th to the (2-1)-th feature maps for testing either by (i) allowing the respective H decoding filters to respectively use both the (3-1)-th to the (3-H)-th feature maps for testing and feature maps for testing obtained from respective previous decoding filters of the respective H decoding filters or by (ii) allowing respective K-H decoding filters that are not associated with the (3-1)-th to the (3-H)-th filters to use feature maps for testing gained from respective previous decoding filters of the respective K-H decoding filters.

Herein, all the feature maps for testing may refer to feature maps derived from the test image through a series of operations performed by each filter in the encoding layer, the intermediate layer and the decoding layer in the testing device.

Meanwhile, the testing method using the testing device for performing image segmentation may not execute the backpropagation process. Further, the testing method for performing image segmentation may utilize the optimal parameters acquired through the learning process.

As the present invention may be appreciated by those skilled in the art, images described above, e.g. the training image or the test image, may be received and transferred by the communication part of the learning device and that of the testing device, and data for performing operations with feature maps may be held/maintained by the processor (and/or memory) thereof, but it is not limited thereto.

The present invention has an effect of efficiently executing image segmentation by disposing filters capable of performing dilation convolution operations between the filters in the encoding layer and the filters in the decoding layer.

Also, the present invention has another effect of performing the image segmentation by using the information on edges of object(s) within the input image and information on context.

The embodiments of the present invention as explained above can be implemented in a form of executable program commands through a variety of computer means recordable to computer readable media. The computer readable media may include solely or in combination, program commands, data files, and data structures. The program commands recorded to the media may be components specially designed for the present invention or may be usable to a skilled human in a field of computer software. Computer readable record media include magnetic media such as hard disk, floppy disk, and magnetic tape, optical media such as CD-ROM and DVD, magneto-optical media such as floptical disk and hardware devices such as ROM, RAM, and flash memory specially designed to store and carry out programs. Program commands include not only a machine language code made by a complier but also a high level code that can be used by an interpreter etc., which is executed by a computer. The aforementioned hardware device can work as more than a software module to perform the action of the present invention and they can do the same in the opposite case.

As seen above, the present invention has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A learning method for improving image segmentation by using a computing device having a processor and including a convolutional neural network, wherein the computing device includes (i) an encoding layer having each of a (1-1)-th to a (1-K)-th filters respectively generating a (1-1)-th to a (1-K)-th feature maps by applying one or more convolution operations to a training image as an input image; (ii) a decoding layer having each of a (2-K)-th to a (2-1)-th filters respectively generating a (2-K)-th to a (2-1)-th feature maps by applying one or more deconvolution operations to the (1-K)-th feature maps; and (iii) an intermediate layer having each of a (3-1)-th to a (3-H)-th filters respectively arranged between each of H encoding filters among the K filters included in the encoding layer and each of H decoding filters among the K filters included in the decoding layer, comprising steps of:
   (a) the computing device receiving the training image;
   (b) the computing device acquiring or supporting another device to acquire the (1-1)-th to the (1-K)-th feature maps through the encoding layer;
   (c) the computing device acquiring or supporting another device to acquire a (3-1)-th to a (3-H)-th feature maps by respectively inputting each output of the H encoding filters to the (3-1)-th to the (3-H)-th filters;

(d) the computing device performing a process of sequentially acquiring the (2-K)-th to the (2-1)-th feature maps either by (i) the respective H decoding filters respectively using both the (3-1)-th to the (3-H)-th feature maps and feature maps obtained from respective previous decoding filters of the respective H decoding filters or by (ii) respective K-H decoding filters that are not associated with the (3-1)-th to the (3-H)-th filters using feature maps gained from respective previous decoding filters of the respective K-H decoding filters;

(e) the computing device adjusting parameters of at least part of the (2-1)-th to the (2-K)-th filters and the (3-1)-th to the (3-H)-th filters and the (1-1)-th to the (1-K)-th filters by performing a backpropagation process with a difference between a Ground Truth (GT) label image and the (2-1)-th feature map; and (f) the computing device outputting a label image from the decoding layer based on the (1-1)-th to a (1-K)-th feature maps, the (2-K)-th to a (2-1)-th feature maps, and the (3-1)-th to the (3-H)-th feature maps, wherein the label image is a set of the semantic segments with clear boundaries such that the semantic segments collectively cover the test image.

2. The method of claim 1, wherein the computing device, at the step of (a), generates the (1-1)-th to the (1-K)-th feature maps by respectively allowing the (1-1)-th to the (1-K)-th filters to respectively reduce sizes of their corresponding feature maps while increasing number of channels thereof; wherein the computing device, at the step of (b), generates the (3-1)-th to the (3-H)-th feature maps by the (3-1)-th to the (3-H)-th filters extracting edges information from the output of the H encoding filters; and wherein the computing device, at the step of (c), generates the (2-K)-th to the (2-1)-th feature maps by the (2-K)-th to the (2-1)-th filters respectively increasing sizes of their corresponding feature maps while decreasing the number of channels thereof.

3. The method of claim 2, wherein the computing device, at the step of (b), acquires the (3-1)-th to the (3-H)-th feature maps by extracting portions in which a frequency change is equal to or greater than a predetermined threshold value from the output of the H encoding filters.

4. The method of claim 1, wherein, if H is equal to K, the computing device (i) generates each of the (3-1)-th to the (3-K)-th feature maps by inputting each of the (1-1)-th to the (1-K)-th feature maps to the (3-1)-th to the (3-K)-th filters and then (ii) relays each of the (3-1)-th to the (3-K)-th feature maps to the (2-1)-th to the (2-K)-th filters.

5. The method of claim 1, wherein at least one of the (3-1)-th to the (3-H)-th filters performs Dilation Convolution operations.

6. The method of claim 5, wherein at least one of the (3-1)-th to the (3-H)-th filters performs Convolution operations.

7. The method of claim 5, wherein a part of receptive field of each filter in the intermediate layer which performs Dilation Convolution Operation among the (3-1)-th to the (3-H)-th filters is configured to be filled with zero.

8. The method of claim 1, wherein the computing device, at the step of (c), performs Deconvolution operations by using both information on the (3-1)-th to the (3-H)-th feature maps and information on the feature maps obtained from the respective previous decoding filters of the respective H decoding filters, and acquires feature maps, from the H decoding filters, among the (2-1)-th to the (2-K)-th feature maps.

9. The method of claim 1, wherein, if the (3-H)-th filter interacts with the (1-K)-th filter, the computing device, at the step of (c), acquires the (2-K)-th feature map by the (2-K)-th filter performing a Deconvolution operation on the (3-H)-th feature map obtained from the (3-H)-th filter.

10. The method of claim 1, wherein, if the (3-H)-th filter interacts with the (1-K)-th filter, the computing device, at the step of (c), acquires the (2-K)-th feature map by the (2-K)-th filter performing a Deconvolution operation on both the (1-K)-th feature map and the (3-H)-th feature map obtained from the (3-H)-th filter.

11. A testing method for performing image segmentation on a test image as an input image by using a computing device having a processor and including a convolutional neural network, comprising steps of:

(a) a testing device receiving or supporting another device to receive the test image, on conditions that (I) the computing device includes (i) an encoding layer having each of a (1-1)-th to a (1-K)-th filters respectively generating a (1-1)-th to a (1-K)-th feature maps for training by applying one or more convolution operations to a training image; (ii) a decoding layer having each of a (2-K)-th to a (2-1)-th filters respectively generating a (2-K)-th to a (2-1)-th feature maps for training by applying one or more deconvolution operations to the (1-K)-th feature maps for training; and (iii) an intermediate layer having each of a (3-1)-th to a (3-H)-th filters respectively arranged between each of H encoding filters among the K filters included in the encoding layer and each of H decoding filters among the K filters included in the decoding layer, (II) the computing device performs processes of (i) acquiring, if the training image is obtained, the (1-1)-th to the (1-K)-th feature maps for training through the encoding layer; (ii) acquiring a (3-1)-th to a (3-H)-th feature maps for training by respectively inputting each output of the H encoding filters to the (3-1)-th to the (3-H)-th filters; (iii) sequentially acquiring the (2-K)-th to the (2-1)-th feature maps for training from the decoding layer either by the respective H decoding filters respectively using both the (3-1)-th to the (3-H)-th feature maps for training and feature maps for training obtained from respective previous decoding filters of the respective H decoding filters or by respective K-H decoding filters that are not associated with the (3-1)-th to the (3-H)-th filters using feature maps for training gained from respective previous decoding filters of the respective K-H decoding filters; and (iv) adjusting parameters of at least part of the (2-1)-th to the (2-K)-th filters and the (3-1)-th to the (3-H)-th filters and the (1-1)-th to the (1-K)-th filters by performing a backpropagation process with a difference between a Ground Truth (GT) label image and the (2-1)-th feature maps for training;

(b) the testing device acquiring or supporting another device to acquire the (1-1)-th to the (1-K)-th feature maps for testing through the encoding layer;

(c) the testing device acquiring or supporting another device to acquire a (3-1)-th to a (3-H)-th feature maps for testing by respectively inputting each output of the H encoding filters to the (3-1)-th to (3-H)-th filters;

(d) the testing device performing a process of sequentially acquiring the (2-K)-th to the (2-1)-th feature maps for testing either by (i) the respective H decoding filters respectively using both the (3-1)-th to the (3-H)-th feature maps for testing and feature maps for testing obtained from respective previous decoding filters of the respective H decoding filters or by (ii) respective K-H decoding filters that are not associated with the (3-1)-th to the (3-H)-th filters using feature maps for testing gained from respective previous decoding filters of the respective K-H decoding filters; and (e) the testing device outputting a label image from the decoding layer based on the (1-1)-th to a (1-K)-th feature maps, the (2-K)-th to a (2-1)-th feature maps, and the (3-1)-th to the (3-H)-th feature maps, wherein the label image is a set of the semantic segments with clear boundaries such that the semantic segments collectively cover the test image.

12. The method of claim 11, wherein the testing device, at the step of (b), generates the (1-1)-th to the (1-K)-th feature maps for testing by the (1-1)-th to the (1-K)-th filters respectively reducing sizes of their corresponding feature maps while increasing number of channels thereof; wherein the testing device, at the step of (c), generates the (3-1)-th to the (3-H)-th feature maps for testing by the (3-1)-th to the (3-H)-th filters extracting edges information from the output of the H encoding filters; and wherein the testing device, at the step of (d), generates the (2-K)-th to the (2-1)-th feature maps for testing by the (2-K)-th to the (2-1)-th filters respectively increasing sizes of their corresponding feature maps while decreasing the number of channels thereof.

13. The method of claim 12, wherein the testing device, at the step of (c), acquires the (3-1)-th to the (3-H)-th feature maps for testing by extracting portions in which a frequency change is equal to or greater than a predetermined threshold value from the output of the H encoding filters.

14. The method of claim 11, wherein at least one of the (3-1)-th to the (3-H)-th filters performs Dilation Convolution operations.

15. The method of claim 11, wherein the testing device, at the step of (d), performs deconvolution operations by using both information on the (3-1)-th to the (3-H)-th feature maps for testing and information on the feature maps for testing obtained from the respective previous decoding filters of the respective H decoding filters, and acquires feature maps for testing from the H decoding filters.

16. A computing device including a convolutional neural network for improving image segmentation, wherein the computing device includes (i) an encoding layer having each of a (1-1)-th to a (1-K)-th filters respectively generating a (1-1)-th to a (1-K)-th feature maps by applying one or more convolution operations to a training image as an input image; (ii) a decoding layer having each of a (2-K)-th to a (2-1)-th filters respectively generating a (2-K)-th to a (2-1)-th feature maps by applying one or more deconvolution operations to the (1-K)-th feature maps; and (iii) an intermediate layer having each of a (3-1)-th to a (3-H)-th filters respectively arranged between each of H encoding filters among the K filters included in the encoding layer and each of H decoding filters among the K filters included in the decoding layer, comprising:

a communication part that receives the input image;

a processor that performs processes of (I) acquiring, if the input image is obtained, the (1-1)-th to the (1-K)-th feature maps through the encoding layer; (II) acquiring a (3-1)-th to a (3-H)-th feature maps by respectively inputting each output of the H encoding filters to the (3-1)-th to the (3-H)-th filters; (III) sequentially acquiring the (2-K)-th to the (2-1)-th feature maps either by (i) the respective H decoding filters respectively using both the (3-1)-th to the (3-H)-th feature maps and feature maps obtained from respective previous decoding filters of the respective H decoding filters or by (ii) respective K-H decoding filters that are not associated with the (3-1)-th to the (3-H)-th filters using feature maps gained from respective previous decoding filters of the respective K-H decoding filters; and (IV) adjusting parameters of at least part of the (2-1)-th to the (2-K)-th filters and the (3-1)-th to the (3-H)-th filters and the (1-1)-th to the (1-K)-th filters by performing a backpropagation process with a difference between a Ground Truth (GT) label image and the (2-1)-th feature map; and wherein the processor outputs a label image from the decoding layer based on the (1-1)-th to a (1-K)-th feature maps, the (2-K)-th to a (2-1)-th feature maps, and the (3-1)-th to the (3-H)-th feature maps, wherein the label image is a set of the semantic segments with clear boundaries such that the semantic segments collectively cover the test image.

17. The computing device of claim 16, wherein the processor is configured to generate the (1-1)-th to the (1-K)-th feature maps by the (1-1)-th to the (1-K)-th filters respectively reducing sizes of their corresponding feature maps while increasing number of channels thereof, to generate the (3-1)-th to the (3-H)-th feature maps by the (3-1)-th to the (3-H)-th filters extracting edges information from the output of the H encoding filters, and to generate the (2-K)-th to the (2-1)-th feature maps by the (2-K)-th to the (2-1)-th filters respectively increasing sizes of their corresponding feature maps while decreasing the number of channels thereof.

18. The computing device of claim 17, wherein the processor is configured to acquire the (3-1)-th to the (3-H)-th feature maps by extracting portions in which a frequency change is equal to or greater than a predetermined threshold value from the output of the H encoding filters.

19. The computing device of claim 16, wherein the processor is configured to (i) generate each of the (3-1)-th to the (3-K)-th feature maps by inputting each of the (1-1)-th to the (1-K)-th feature maps to the (3-1)-th to the (3-K)-th filters and then to (ii) relay each of the (3-1)-th to the (3-K)-th feature maps to the (2-1)-th to the (2-K)-th filters, and H has an equal value with K.

20. The computing device of claim 16, wherein at least one of the (3-1)-th to the (3-H)-th filters performs Dilation Convolution operations.

21. The computing device of claim 20, wherein at least one of the (3-1)-th to the (3-H)-th filters performs Convolution operations.

22. The computing device of claim 20, wherein a part of receptive field of each filter in the intermediate layer which performs Dilation Convolution Operation among the (3-1)-th to the (3-H)-th filters is configured to be filled with zero.

23. The computing device of claim 16, wherein the processor is configured to (i) perform Deconvolution operations by using both information on the (3-1)-th to the (3-H)-th feature maps and information on the feature maps obtained from the respective previous decoding filters of the respective H decoding filters, and to (ii) acquire feature maps, from the H decoding filters, among the (2-1)-th to the (2-K)-th feature maps.

24. The computing device of claim 16, wherein the processor, if the (3-H)-th filter interacts with the (1-K)-th filter, is configured to acquire the (2-K)-th feature map by the (2-K)-th filter performing deconvolution operation on the (3-H)-th feature map obtained from the (3-H)-th filter.

25. The computing device of claim 16, wherein the processor, if the (3-H)-th filter interacts with the (1-K)-th filter, is configured to acquire the (2-K)-th feature map by the (2-K)-th filter performing Deconvolution operation on both the (1-K)-th feature map and the (3-H)-th feature map obtained from the (3-H)-th filter.

26. A testing device including a convolutional neural network for performing image segmentation on a test image as an input image by using a computing device, comprising:
a communication part that receives the test image, on conditions that (I) the computing device includes (i) an encoding layer having each of a (1-1)-th to a (1-K)-th filters respectively generating a (1-1)-th to a (1-K)-th feature maps for training by applying one or more convolution operations to a training image; (ii) a decoding layer having each of a (2-K)-th to a (2-1)-th filters respectively generating a (2-K)-th to a (2-1)-th feature maps for training by applying one or more deconvolution operations to the (1-K)-th feature maps for training; and (iii) an intermediate layer having each of a (3-1)-th to a (3-H)-th filters respectively arranged between each of H encoding filters among the K filters included in the encoding layer and each of H decoding filters among the K filters included in the decoding layer, (II) the computing device performs processes of (i) acquiring, if the training image is obtained, the (1-1)-th to the (1-K)-th feature maps for training through the encoding layer; (ii) acquiring a (3-1)-th to a (3-H)-th feature maps for training by respectively inputting each output of the H encoding filters to the (3-1)-th to the (3-H)-th filters; (iii) sequentially acquiring the (2-K)-th to the (2-1)-th feature maps for training from the decoding layer either by the respective H decoding filters respectively using both the (3-1)-th to the (3-H)-th feature maps for training and feature maps for training obtained from respective previous decoding filters of the respective H decoding filters or by respective K-H decoding filters that are not associated with the (3-1)-th to the (3-H)-th filters using feature maps for training gained from respective previous decoding filters of the respective K-H decoding filters; and
(iv) adjusting parameters of at least part of the (2-1)-th to the (2-K)-th filters and the (3-1)-th to the (3-H)-th filters and the (1-1)-th to the (1-K)-th filters by performing a backpropagation process with a difference between a Ground Truth (GT) label image and the (2-1)-th feature maps for training;
a processor that performs processes of (I) acquiring the (1-1)-th to the (1-K)-th feature maps for testing through the encoding layer; (II) acquiring a (3-1)-th to a (3-H)-th feature maps for testing by respectively inputting each output of the H encoding filters to the (3-1)-th to (3-H)-th filters; and (III) the testing device performing a process of sequentially acquiring the (2-K)-th to the (2-1)-th feature maps for testing either by (i) the respective H decoding filters respectively using both the (3-1)-th to the (3-H)-th feature maps for testing and feature maps for testing obtained from respective previous decoding filters of the respective H decoding filters or by (ii) respective K-H decoding filters that are not associated with the (3-1)-th to the (3-H)-th filters using feature maps for testing gained from respective previous decoding filters of the respective K-H decoding filters; and
wherein the processor outputs a label image from the decoding layer based on the (1-1)-th to a (1-K)-th feature maps, the (2-K)-th to a (2-1)-th feature maps, and the (3-1)-th to the (3-H)-th feature maps,
wherein the label image is a set of the semantic segments with clear boundaries such that the semantic segments collectively cover the test image.

27. The testing device of claim 26, wherein the processor is configured to generate the (1-1)-th to the (1-K)-th feature maps for testing by the (1-1)-th to the (1-K)-th filters respectively reducing sizes of their corresponding feature maps while increasing number of channels thereof, to generate the (3-1)-th to the (3-H)-th feature maps for testing by the (3-1)-th to the (3-H)-th filters extracting edges information from the output of the H encoding filters, and to generate the (2-K)-th to the (2-1)-th feature maps for testing by the (2-K)-th to the (2-1)-th filters respectively increasing sizes of their corresponding feature maps while decreasing the number of channels thereof.

28. The testing device of claim 27, wherein the processor is configured to acquire the (3-1)-th to the (3-H)-th feature maps for testing by extracting portions in which a frequency change is equal to or greater than a predetermined threshold value from the output of the H encoding filters.

29. The testing device of claim 26, wherein at least one of the (3-1)-th to the (3-H)-th filters performs Dilation Convolution operations.

30. The testing device of claim 26, wherein the H decoding filters performs deconvolution operations by using both information on the (3-1)-th to the (3-H)-th feature maps for testing and information on the feature maps for testing obtained from the respective previous decoding filters of the respective H decoding filters, and to acquire feature maps for testing.

* * * * *